United States Patent [19]
Yasui

[11] Patent Number: 6,011,370
[45] Date of Patent: Jan. 4, 2000

[54] SERVO-MOTOR DRIVING METHOD

[75] Inventor: Takaji Yasui, Nagano, Japan

[73] Assignee: Tamagawa Seiki Kabushiki Kaisha, Nagano-Ken, Japan

[21] Appl. No.: 09/164,772

[22] Filed: Oct. 1, 1998

[30] Foreign Application Priority Data

Oct. 8, 1997 [JP] Japan .................................. 9-275902

[51] Int. Cl.[7] .................................................. H02P 5/402
[52] U.S. Cl. ........................... 318/455; 318/459; 318/650
[58] Field of Search ...................................... 318/565, 650, 318/430, 438, 452, 453, 454, 455, 459, 722, 729

[56] References Cited

U.S. PATENT DOCUMENTS 3,743,911  7/1973  Erler .......................................... 318/599
4,536,689  8/1985  Davidson .................................. 318/565
5,132,599  7/1992  Kono et al. .............................. 318/618
5,780,989  7/1998  Matsumoto .............................. 318/632

Primary Examiner—Bentsu Ro
Attorney, Agent, or Firm—Sughrue, Mion, Zinn, Macpeak & Seas, PLLC

[57] ABSTRACT

A conventional method for driving a servo-motor carried out control by means of a current feedback loop, using a current sensor and an A/D converter; therefore, the number of parts was great, cost reduction was difficult and it was difficult to avoid control errors caused by errors in the precision of the current sensor.

A method for driving a servo-motor of the present invention comprises detecting a power voltage (V) of a servo-motor (4), controlling a voltage command (Vcmd) to a power converter (3) by numeric calculation using a detected value (Vcc) of this power voltage (V), and controlling power of a drive current (Iu, Iv, Iw).

1 Claim, 4 Drawing Sheets

SERVO-MOTOR DRIVING METHOD

BACKGROUND OF THE INVENTION

1. Field of the Invention

The present invention relates to a method for driving a servo-motor, and more particularly to a new improvement for detecting power voltage without using a current feedback loop, comprising a current sensor and an A/D converter, which is conventionally used for detecting motor current, and controlling current using this detected value, thereby improving control properties when motor temperature has increased and lowering cost.

2. Description of the Related Art

FIG. 1 shows a conventional method of this type which has generally been used as a method for driving a servo-motor.

That is, a current command Icmd is input to a calculator 1. The output 1a of the calculator 1 is sent via a proportional and/or integral controller 2 and is input as a voltage command 2a to a power converter 3, comprising a known power element configuration. The power converter 3 supplies a three-phase drive current Iu, Iv, Iw to a servo-motor 4. A current sensor 5 detects one part of the three-phase drive current Iu, Iv, Iw, and the detected current value Ivcc is input to the calculator 1 via an A/D converter 6, thereby forming a current feedback control.

Since the conventional servo-motor driving method has the configuration described above, it has problems such as the following.

That is, a current sensor and an expensive A/D converter are required in order to form the current feedback system, constituting a considerable obstacle to lowering the cost of the control system.

SUMMARY OF THE INVENTION

The present invention has been realized in order to solve the above problems and particularly aims to provide a method for driving a servo-motor wherein, by detecting power voltage without using a conventional current feedback loop for motor current detection and controlling current using this detected value, control properties can be improved and cost lowered, and in addition, control performance can be improved when motor temperature has increased.

The method for driving a servo-motor based on a current command of the present invention comprises the steps of: detecting a power voltage for driving the servo-motor; current-controlling a drive current of the servo-motor using a detected value of the power voltage; correcting a motor resistance, used in a numeric calculation of the current-controlling, using an estimated value of increase in motor resistance obtained using a command voltage, based on the current command, and an output power, which is the product of the power voltage and power current; and correcting changes in motor resistance caused by an increase in temperature of the servo-motor.

DESCRIPTION OF THE PREFERRED EMBODIMENT

Figure 1:
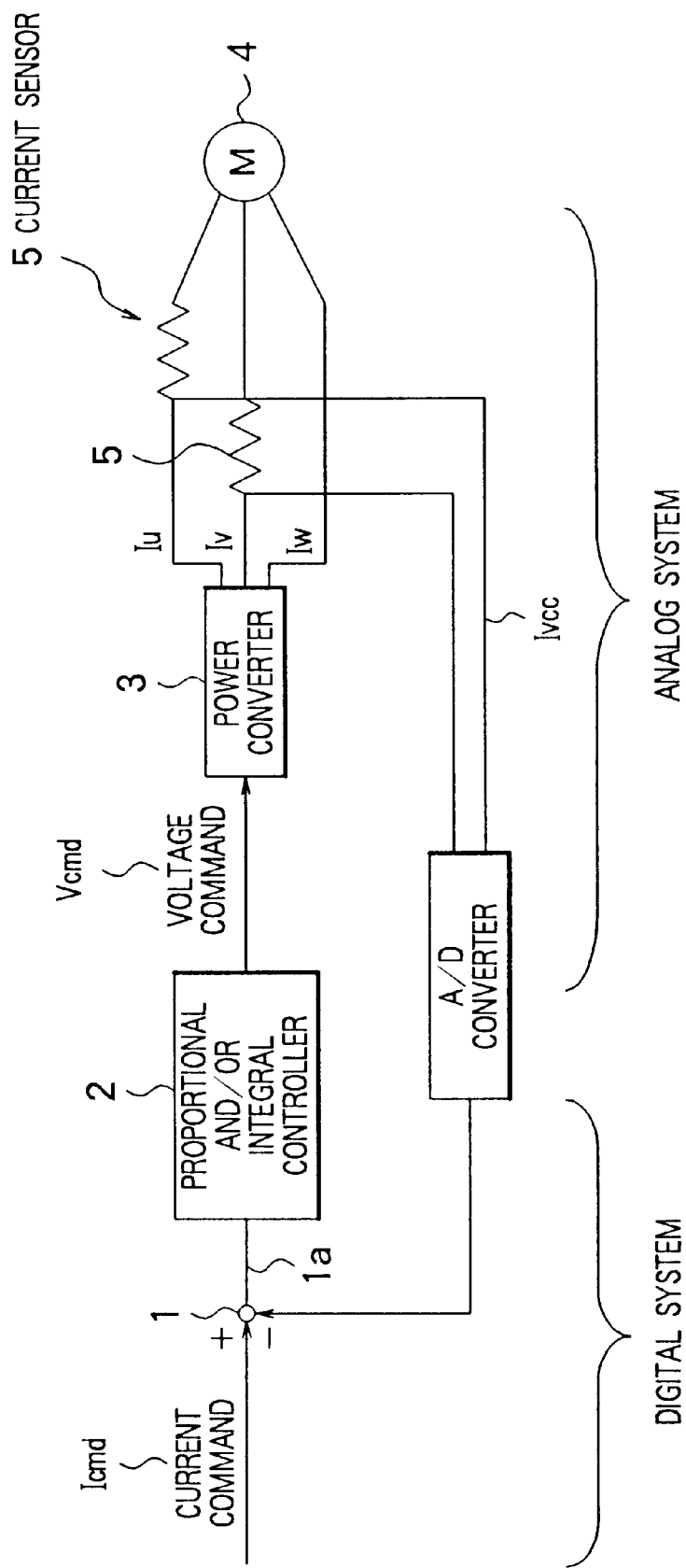
FIG. 1 is a block diagram showing a conventional control method.

There will be detailed below the preferred embodiment of the servo-motor driving method of the present invention with reference to the accompanying drawings. Like and similar members to the conventional example are explained using like reference characters.

Figure 2:
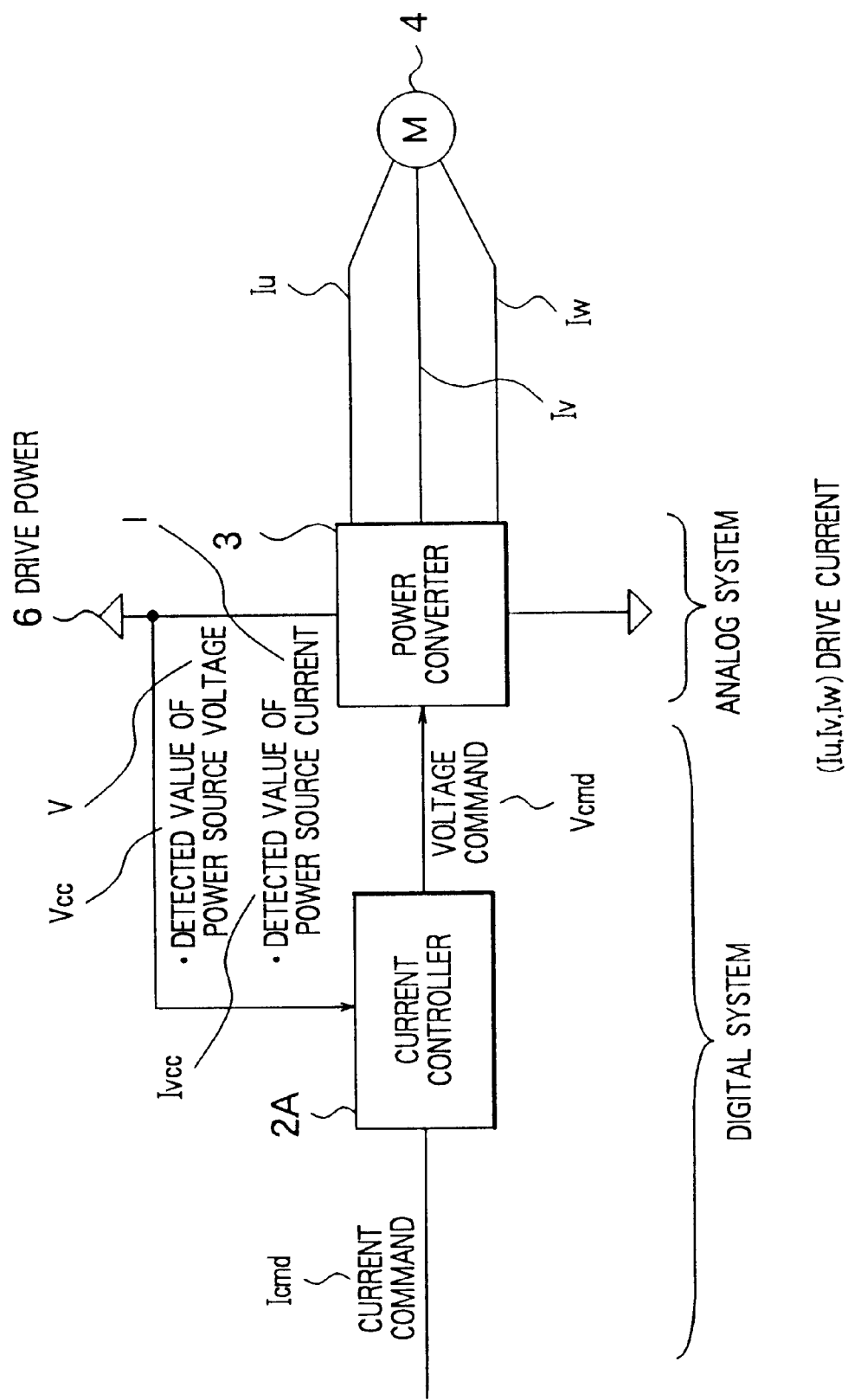
FIG. 2 is a block diagram showing a servo-motor driving method according to the present invention.

As shown in FIG. 2, current command Icmd, which comprises a current command value, is input to a current controller 2A and a voltage command Vcmd from the current controller 2A is applied to a known power converter 3. A drive power source 6, for driving power elements not shown in the diagram, is connected to the power converter 3. The power converter 3 supplies a three-phase drive current Iu, Iv, Iw to a servo-motor 4. Furthermore, a detected value Vcc of a power voltage V of the drive power source 6 and a detected value Ivcc of a power current I of the drive power source 6 are captured by the current controller 2A.

The control system shown in FIG. 2 differs from the conventional control system of FIG. 1 in respect of the fact that the current controller 2A applies a voltage command 2a, which is controlled using the detected value Vcc of the power voltage V and the detected value Ivcc of the power current I of the drive source 6, to the power converter 3. Then, the servo-motor 4 is drive-controlled by the three-phase drive current Iu, Iv, Iw obtained from the power converter 3.

Figure 3:
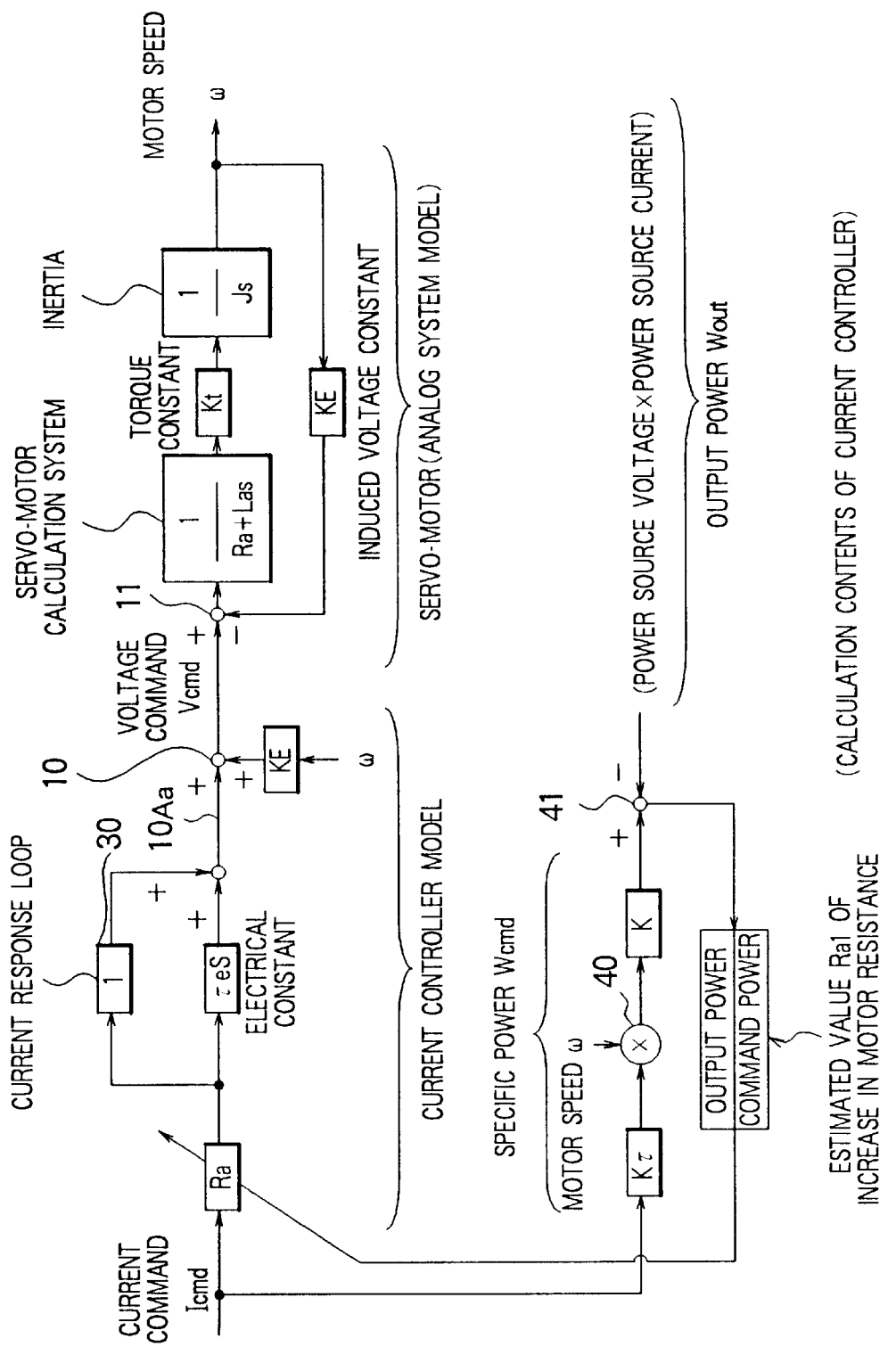
FIG. 3 is a control block diagram showing calculation contents of the current controller of FIG. 2.

Next, the calculation control of the current controller 2A will be explained more specifically. FIG. 3 shows the calculation contents of the servo-motor 4 and the current controller 2A as blocks. The current command Icmd is input to a first calculator 10A via a reverse calculation system (Ra), which is reverse with respect to the calculation system (1/Ra+Las) of the servo-motor 4, a current response loop 30 and an electrical time-constant τes. The output 10Aa from the first calculator 10A is input to a second calculator 10. The output Vcmd of the second calculator 10 passes via a third calculator 11 and via the calculation system (1/Ra+Las), a torque constant kt and an inertia 1/Js, whereby a motor speed ω is obtained. Here, the abovementioned Ra represents motor resistance, La represents motor inductance and s represents a Laplace operator. Each induced voltage constant KE obtained from the motor speed ω is input to the calculators 10 and 11.

Furthermore, the current command Icmd is input to a subtractor 41 which subtracts a command power Wcmd, comprising the torque constant kt, a multiplier 40 and a constant k, from an output power Wout, which is the product of the power voltage V and the power current I. The motor resistance Ra is corrected by inputting thereto the estimated value Ra1 of the increase in motor resistance obtained from the subtractor 41. That is, this correction improves control performance at increased temperature by tuning changes in resistance when the temperature of the servo-motor 4 has increased.

Figure 4:
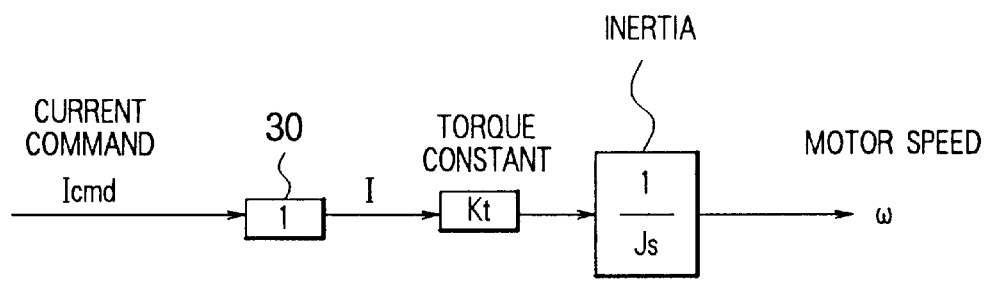
FIG. 4 is a control block diagram showing the normal control state of FIG. 3.

Next, when calculation control with the configuration of FIG. 3 is functioning normally, it reaches the calculation control state shown in FIG. 4, where the response of the current response loop 30 of the servo-motor 4 is 1, and the current control system accurately follows the current target value. However, in the current control system shown in FIG. 4, in order to directly receive fluctuations in the power voltage V, a detected value Vcc of the power voltage V must be detected and the voltage command Vcmd must be corrected accordingly.

Figure 5:
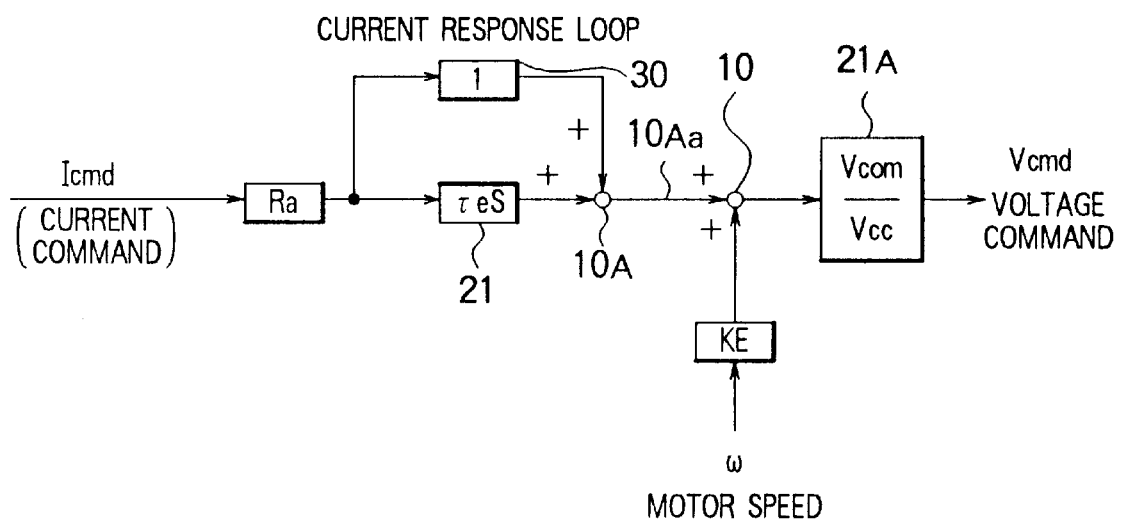
FIG. 5 is a block diagram for calculating a voltage command of the current controller of FIG. 2.

In order to perform the above correction, control is carried out by means of a numeric calculation using a calculation control system comprising the calculation control blocks shown in FIG. 5. Firstly, the current command Icmd is input to the second calculator 10 from the first calculator 10A via a first loop 30, wherein the response of the current response loop from the motor resistance R is 1, and a second loop 21 ($\tau$es, a product of the electrical time-constant $\tau$e and the Laplace operator s, where $\tau$e is equal to La [motor inductance]/Ra [motor resistance]) in the same way as already depicted in FIG. 3. A voltage calculator 21A controls the output 11a of the second calculator 11 by numeric calculation of Vcom/Vcc (where Vcom is a projected value of the power voltage V and Vcc is the detected value of the power voltage V). Then, the voltage command Vcmd, which has now been corrected in accordance with the fluctuation in the power voltage V, is applied to the power converter 3. The program sequence for calculating the voltage command Vcmd in FIG. 5 is expressed by equation (1) in the following expression:

$$Vcmd=\{Ra(Ik-\tau e/T[Ik-Ik-1])+kE\cdot\omega k\}Vcom/Vcc \quad \text{[Exp. 1]}$$

Ik—current command when sampling k

Ik−1—current command when sampling (k−1)

$\omega$k—motor speed when sampling k

T—sampling time

Ra—motor resistance $\tau$e—electrical time-constant=La/Ra

La—motor inductance kE—induced voltage constant

Vcom—projected value of power voltage

Vcc—detected value of power voltage

Vcmd—voltage command

Furthermore, during normal calculation control, equality is achieved wherein K·Icmd×kt×$\omega$=Vcc×Ivcc (where k is a proportional constant, Icmd is a motor current command, kt is the torque constant, $\omega$ is the motor speed, Vcc is the detected value of power voltage and Ivcc is the detected value of power current). Therefore, a case where the above equality is not achieved is deemed to be a state of motor overcurrent, namely a control irregularity.

The servo-motor driving method of the present invention has the configuration described above and therefore obtains the following advantageous effects. Namely, since the entire system can be controlled with a numeric calculation open loop, there is no need for the current feedback system using a current sensor and an A/D converter which has conventionally been used. The consequent reduction of parts enables cost to be reduced. In addition, deterioration of control precision caused by current sensor noise can be prevented. Furthermore, since changes in resistance due to increased temperature of the servo-motor are corrected, servo-motor rotation properties which are not dependent on temperature can be obtained, improving control performance.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A method for driving a servo-motor based on a current command, comprising the steps of:

detecting a power voltage for driving said servo-motor;

current-controlling a drive current of said servo-motor using a detected value of said power voltage;

correcting a motor resistance, used in a numeric calculation of said current-controlling, using an estimated value of increase in motor resistance obtained using a command voltage, based on said current command, and an output power, which is the product of said power voltage and power current; and correcting changes in motor resistance caused by an increase in temperature of said servo-motor.

* * * * *